United States Patent [19]

Story et al.

[11] 4,362,924
[45] Dec. 7, 1982

[54] TEMPERATURE ACHIEVEMENT CONTROLLER

[75] Inventors: Gene F. Story, Westminster; John T. La Belle, Long Beach, both of Calif.

[73] Assignee: Automotive Environmental Systems, Inc., Westminster, Calif.

[21] Appl. No.: 121,817

[22] Filed: Feb. 15, 1980

[51] Int. Cl.³ .............................................. H05B 1/02
[52] U.S. Cl. ................................... 219/497; 219/492; 219/494; 219/501; 307/117; 323/242
[58] Field of Search ............... 219/497, 499, 506, 501, 219/492, 499, 494, 493; 34/30; 323/18, 24, 242, 243; 307/117; 236/14 BG, 46 R

[56] References Cited

U.S. PATENT DOCUMENTS

| | | | |
|---|---|---|---|
| 3,443,121 | 5/1969 | Weisbrod | 219/497 X |
| 3,586,829 | 6/1971 | Farmer | 219/497 |
| 3,633,094 | 1/1972 | Clements | 219/497 |
| 3,814,902 | 6/1974 | Fann | 219/497 |
| 3,826,887 | 7/1974 | Pemberton | 219/497 |
| 3,842,243 | 10/1974 | Gregory | 219/497 |
| 3,946,200 | 3/1976 | Juodikis | 219/499 |
| 3,986,269 | 10/1976 | Hancock | 34/30 |
| 4,114,024 | 9/1978 | Donner | 219/489 |
| 4,130,753 | 12/1978 | Wade | 219/492 |
| 4,184,067 | 1/1980 | Cress | 219/493 |
| 4,206,336 | 6/1980 | Cunningham | 219/497 |

*Primary Examiner*—M. H. Paschall
*Attorney, Agent, or Firm*—Jackson, Jones & Price

[57] ABSTRACT

A temperature achievement controller for controlling the temperature of a device which is heated by a heating unit in accordance with a predetermined temperature versus time schedule. The controller includes apparatus for producing an analog signal which corresponds to the achieved temperature of the device under test and apparatus for producing an analog signal which corresponds to the desired temperature versus time schedule. An error signal equal to the difference between the achieved and desired temperature is generated and coupled to a three mode control unit which produces a control signal proportional to the sum of the derivative of the error signal, the integral of the error signal and the error signal itself. The control signal is received by a duty cycle modulator which controls the ratio of power on time to power off time of the power applied to the heating unit in accordance with the magnitude of the control signal.

14 Claims, 5 Drawing Figures

TEMPERATURE ACHIEVEMENT CONTROLLER

BACKGROUND OF THE INVENTION

1. Field of the Invention

The subject invention relates generally to temperature controllers and more particularly to a precision electronic temperature achievement controller.

2. Description of Prior Art

The increasingly stringent emission control standards being imposed on automobile manufacturers and the like by both federal and state governments have necessitated increasingly accurate testing apparatus for determining compliance with such standards. One recently promulgated emission test is the so-called "Diurnal Breathing Loss Test" (*Federal Register* requirement 86.133-78) which pertains to the measurement of fuel vapor emissions from automobile fuel tanks. The test requires the simulation of the heating of a fuel system experienced by a vehicle parked in a heating environment, (i.e., the warming of the vehicle fuel system while parked outdoors in the sun) following cold soaking through the night. The test is carried out by placing the fuel system to be tested in an enclosure which is commonly called a "SHED" (Sealed Housing for Evaporative Determination). The system under test is then heated by way of a heating blanket or the like at a precisely controlled rate from a predetermined base temperature to a predetermined final temperature. When the final temperature is achieved, the quantity of fuel vapors emitted by the fuel system, which is entrapped in the SHED, is measured to determine compliance.

Temperature achievement controllers are used to measure the actual temperature of the fuel system as it is heated and to control the heat output of the heat blanket is response thereto so that the desired rate of temperature increase is achieved. The prior art controllers have generally been adequate for use in conducting most of the early emission control tests. However, such controllers are believed to be inadequate for conducting many of the more recent emission tests such as the above-noted "Diurnal Breathing Loss Test" which requires, inter alia, that the rate of temperature increase be precisely maintained. One of the primary reasons for the limitations in the prior art controllers is the use in such controllers of proportional control circuits which control the amplitude of the voltage applied to the heating blanket. Proportional control circuits, especially in relatively high power applications, are generally incapable of accurately and rapidly varying the power applied to the heating blanket. Accordingly, the achieved temperature of the fuel system under test will tend to alternately undershoot and overshoot the desired temperature in excess of the maximum specified temperature deviation.

The present invention overcomes most of the limitations of the prior art temperature achievement controllers. The subject controller avoids the exclusive use of proportional control circuitry and is capable of maintaining the temperature of the fuel system under test within a fraction of a degree of the desired temperature. The subject controller is also provided with means for automatically disconnecting the blanket heating power when the temperature of the system under test exceeds a predetermined maximum. Alarms, both audible and visual, are incorporated which provide the operator with a warning of conditions that require his attention.

Other advantages of the subject invention over the prior art will become apparent.

SUMMARY OF THE INVENTION

A temperature achievement controller for controlling the temperature of a device in accordance with a predetermined temperature versus time schedule is disclosed. The controller includes a digital thermometer which measures the achieved temperature of the device under test followed by a digital to analog converter which produces an analog signal proportional to the achieved temperature. A desired temperature signal is generated by a digital circuit such as a counter which sequentially produces a predetermined digital signal which corresponds to the predetermined temperature versus time schedule. The digital signal drives a digital to analog converter which produces an analog signal proportional to the desired temperature.

An error detection circuit produces an error signal which is proportional to the difference between the achieved and the desired temperature signals. The error signal in turn is processed by a three mode control circuit which produces a control signal proportional to the sum of the derivative with respect to time of the error signal, the integral with respect to time of the error signal and the error signal itself. The control signal is received by a duty cycle modulator which controls the ratio of power on time to the power off time of the power which is applied to an electric heating unit which heats the device under test. If the achieved temperature is less than the desired temperature, the power on/off ratio is increased by the control signal. Conversely, the ratio is reduced if the achieved temperature is greater than the desired temperature.

The subject controller further includes various alarms which warn the oprator of certain conditions which require his attention such as overheating of the device under test. Also included is a fail safe system which automatically disconnects power applied to the heating unit if (i) the test has not yet begun, (ii) the test has terminated or (iii) the temperature of the device has exceeded a predetermined limit.

DETAILED DESCRIPTION OF THE INVENTION

Figure 1B:
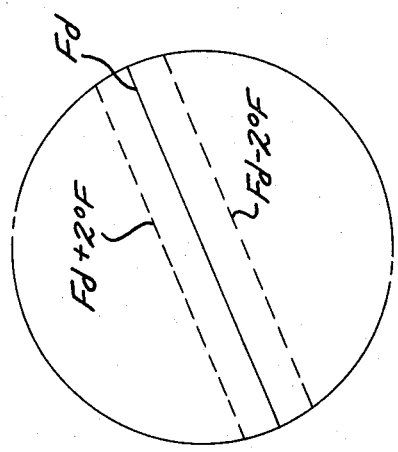
FIG. 1B is an enlarged portion of the FIG. 1A plot showing the minimum and maximum allowed temperature deviation.
Figure 1A:
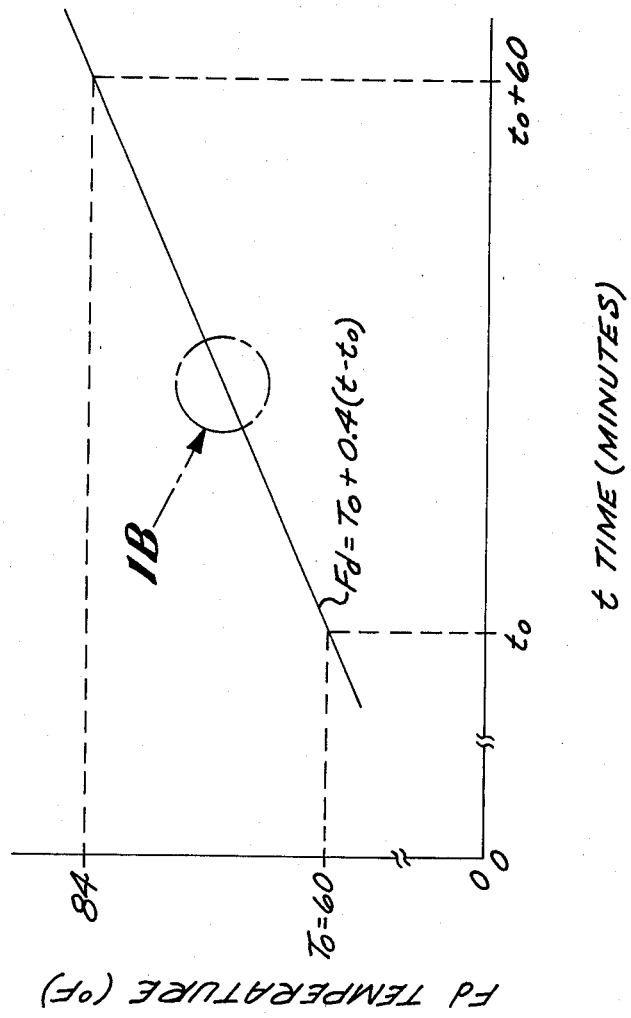
FIG. 1A is a graph showing an exemplary desired temperature versus time plot.

Referring now to the drawings, FIG. 1A is a graph showing the temperature versus time characteristics which must be achieved in carrying out the "Diurnal Breathing Loss Test" as presently specified by the federal government. Line Fd of FIG. 1A represents the desired or optimum temperature versus time characteristics of the fuel system (fuel tank) under test. The temperature of the fuel tank is initially at or below 60° F.

The tank is heated up to 60° F. and from 60° F. to 84° F. in 60 minutes according to the following equation:

$$Fd = To + 0.4(t - to)$$

where
Fd=desired fuel temperature, °F.
$to$=time at which Fd=60° F.
t=time
To=60° F.

The time required to heat the system under test from 60° F. to 84° must be maintained within ±0.5 minutes. Furthermore, the achieved temperature of the system must be maintained within ±2.0° F. of the desired temperature Fd as shown in FIG. 1B.

The subject controller described herein is adapted to provide the temperature versus time characteristics shown in FIG. 1A. However, such characteristics are intended to be exemplary only inasmuch as the controller can be readily adapted for other applications. By way of example, the subject controller can be used in conjunction with a cooling device to cool, rather than heat a device under test according to a predetermined temperature versus time schedule.

Figure 2:
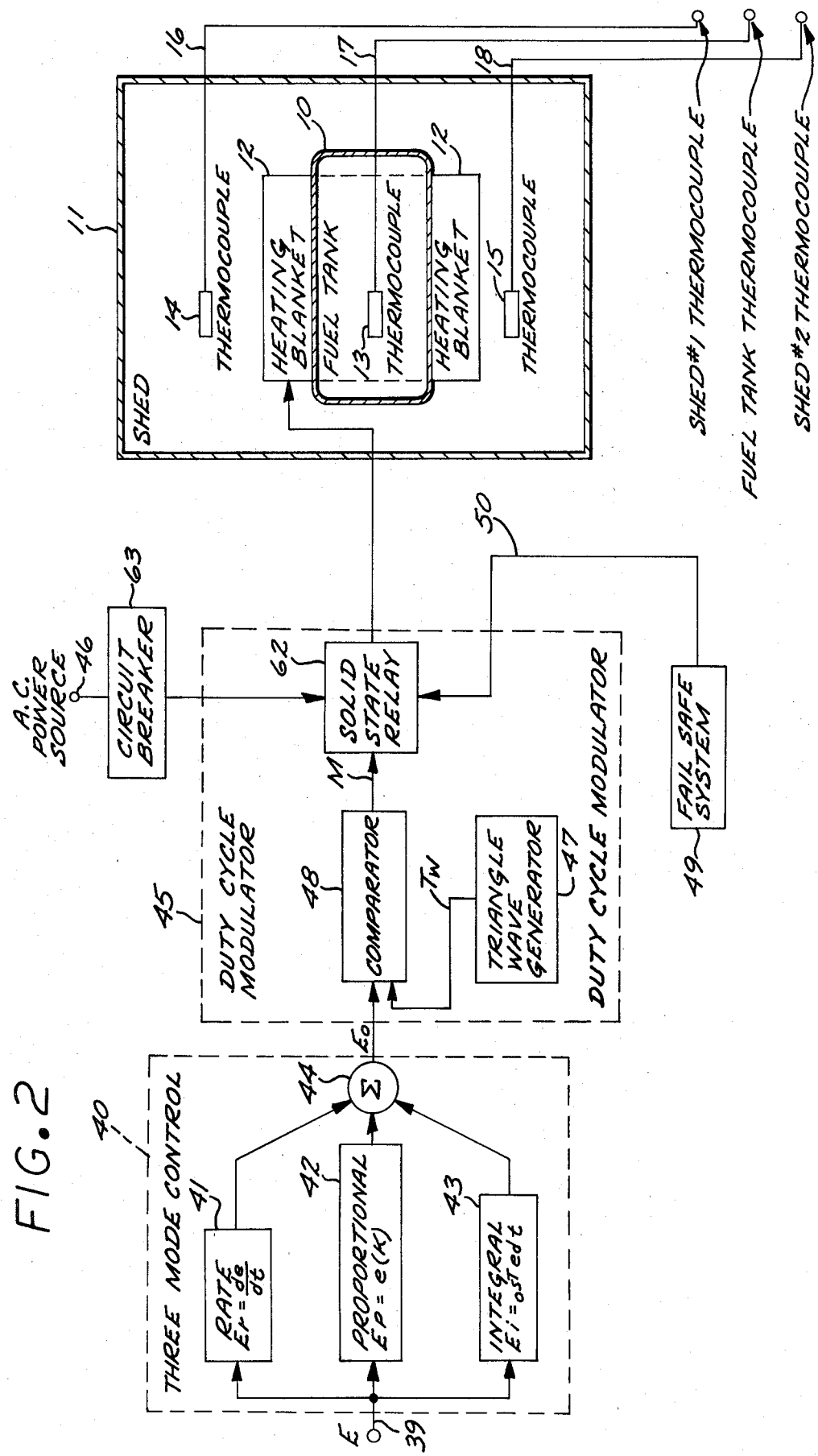
FIG. 2 is a block diagram of a portion of the subject controller together with a simplified schematic representation of the fuel system under test and the SHED enclosing the fuel system.
Figure 3:
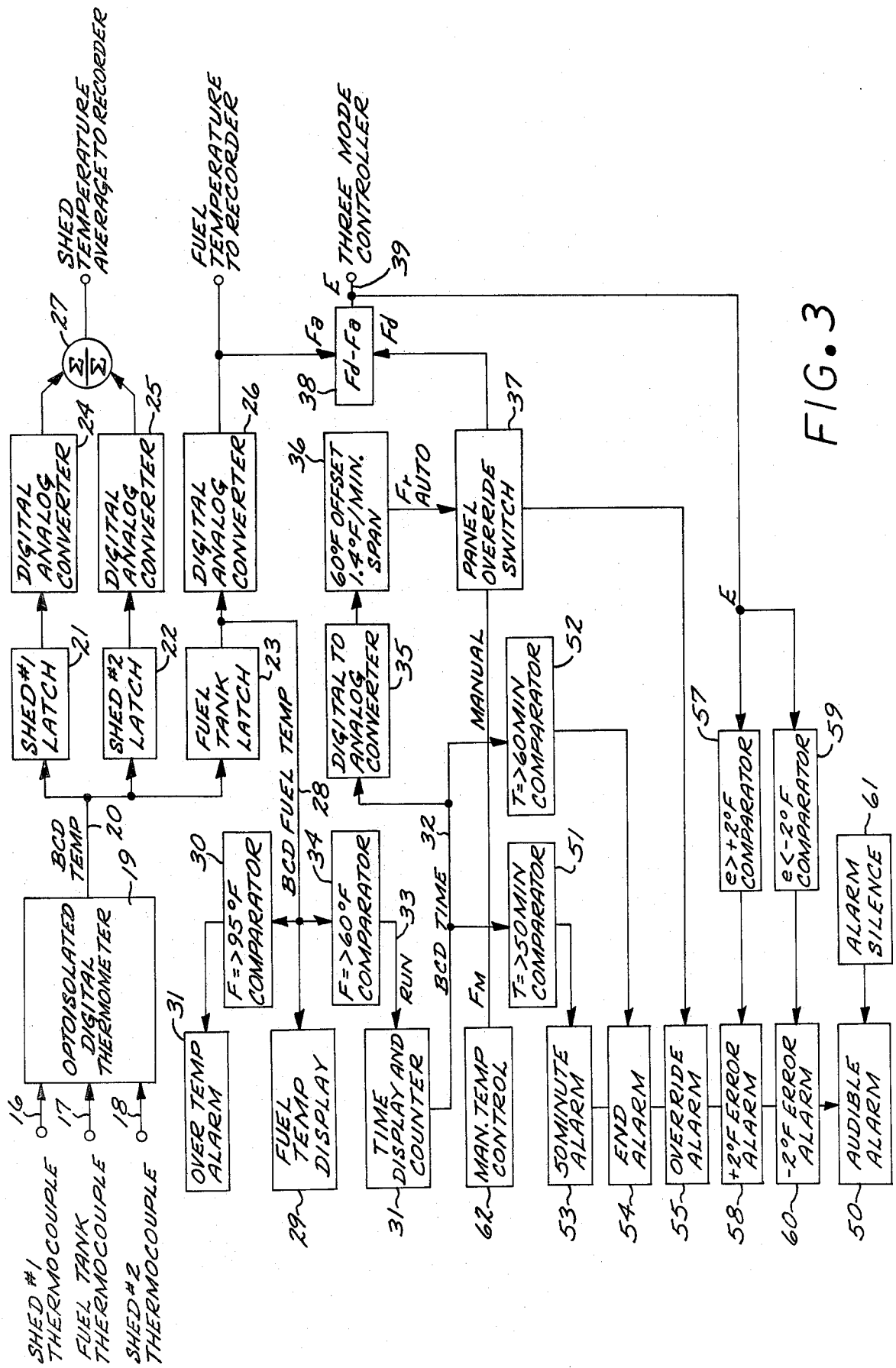
FIG. 3 is a block diagram of a portion of the subject temperature achievement controller.

Referring now to FIG. 2, a block diagram of the output stages of the subject invention may be seen along with a simplified schematic representation of the fuel tank 10 under test. The tank, which is filled with fuel, is positioned within the sealed housing for evaporative determination (SHED) 11. Fuel tank 10 is surrounded by a conventional heating blanket 12 which is powered by 110 volt A.C. power. A precision thermocouple 13 is positioned within fuel tank 10 at the midpoint of the volume of fuel. Two additional pecision thermocouples 14 and 15 (SHED #1 and SHED #2) are located within the SHED at opposite ends thereof. All three thermocouples are preferably of the type "J" iron constant an variety. The outputs of thermocouples 13, 14, and 15 are coupled to the input of a conventional optoisolated digital thermometer 19 (FIG. 3) via lines 16, 17, and 18, respectively. Thermometer 19 is provided with a digital display which permits the operator to select and display each of the three temperature measurements.

Thermometer 19 provides a time multiplexed parallel digital binary coded decimal (BCD) output on a plurality of output lines represented by line 20. Each temperature measurement is comprised of twelve bits of parallel data, four bits for the "tens" digit, four bits for the "ones" digit and four bits for the "tenths" digit. The digital outputs on line 20 are coupled in parallel to the inputs of latches 21, 22 and 23 which demultiplex the thermometer output. Thus, when the SHED #1 temperature measurement is present on output 20, latch 21 is enabled so that the twelve bits of data will be loaded into the latch in parallel and held there until updated by the next SHED #1 measurement. Similarly, when the SHED #2 measurement is present, latch 22 is enabled and when the fuel temperature measurement is present, latch 23 is enabled. The output of latches 21, 22 and 23 are fed in parallel to the inputs of digital to analog converters (DACs) 24, 25 and 26, respectively. DACs 24 and 25 provide an analog output representative of the SHED #1 and SHED #2 measurements and DAC 26 provides an analog output representative of the fuel tank temperature. Each DAC is provided with an amplitude adjustment which is preferably set so that the analog voltages produces are equal to the temperature displayed on thermometer 19 divided by 10. Thus, a displayed fuel tank temperature of 70° F. would produce a DAC 26 output voltage of +7.0 volts.

The outputs of DACs 24 and 25 are coupled to a conventional averaging circuit 27 which effectively adds the DAC output voltages together and divides the result by two. The output voltage of circuit 27, which represents the average of the SHED #1 and SHED #2 temperature measurements, is connected to a temperature recorder (not shown). Similarly, the output Fa of DAC 26, which represents the achieved temperature of the fuel tank under test, is connected to a fuel temperature recorder.

The parallel BCD output of fuel tank latch 23 is also connected via output lines represented by line 28 to a digital temperature display 29 which displays the achieved fuel tank temperature Fa. Output line 28 is also connected to an over-temperature digital comparator circuit 30 which is preset with a digital value which corresponds to 95° F. When the BCD temperature value on line 28 equals or exceeds the present value, comparator 30 actuates an over-temperature alarm. Comparator circuit 30 is provided with manual switches which permit the present value to be changed to accomodate different test specifications. The other digital comparators used in the subject controller also include switches for changing the preset values.

The subject controller further includes a time display and counter circuit 31 which generates a twelve bit parallel BCD time signal with four bits representing "tens" of seconds, four bits representing "ones" of seconds and four bits representing "tenths" of seconds. Also provided is a digital compartor circuit 34 ("begin test" comparator) which compares the BCD achieved fuel temperature data on line 28 with a preset digital value which corresponds to 60° F. When the fuel temperature Fa is equal to or greater than 60° F., comparator 34 generates a "run" signal on line 33 which causes the normally reset time display and counter 31 to begin counting.

The incrementing BCD time signal on line 32 is used to generate a fuel temperature ramp signal Fr. The time signal is connected to the input of a DAC 35 which produces an output voltage ramp signal which is at zero volts when the BCD time data is all zeros and which linearly increases as the time data on line 32 increments. The linear voltage output of DAC 35 is connected to an "offset and span" circuit 36. Circuit 36 provides a precision 6.0 volt offset to the DAC 35 output so that the output Fr of the circuit is at 6.0 volts when the BCD data on line 32 is all zeros. Circuit 36 also has a predetermined gain so that the Fr signal will increase 0.04 volts for every one minute increase is BCD time data. Thus, signal Fr will linearly increase from 6.0 volts to 8.40 volts when the BCD time data increments from zero to sixty minutes. Circuit 36 is preferably provided with a variable offset and span adjustment so that the Fr signal may be adjusted to accomodate different test specifications.

The subject controller is normally operated in an automatic mode wherein the Fr signal is used as the desired temperature ramp signal Fd as shown in FIG. 1A. However, a panel override switch 37 is provided which substitutes a manual ramp signal Fm for the Fr signal. Signal Fm is produced by a manual temperature control circuit 62 which includes a manually adjustable potentiometer calibrated in degrees F. Thus, when the potentiometer is set at 60° F., the voltage level of signal Fm will be at 6.0 volts and when set at 84° F., the level will be at 8.4 volts.

An error detection circuit 38 is provided which compares the achieved temperature signal Fa produced by DAC 26 with the desired temperature signal Fd and produces a bipolar error signal E which is proportional to the difference between signals Fd and Fa. Error signal E on line 39 is coupled to a three mode control unit 40 (FIG. 2). Three mode control unit 40 comprises a conventional analog differentiator circuit 41, a proportional amplifier 42 and a conventional analog integrator circuit 43. Circuits 41–43 have a common input which is coupled to line 39 which carries error signal E. The three mode control unit 40 further comprises a summing circuit 44 which sums (i) signal Er which corresponds to the derivative of signal E with respect to time, (ii) signal Ep which is proportional to signal E and (iii) signal Ei which corresponds to the integral of signal E with respect to time. Also included (not shown) is initializing circuitry which initializes the differentiator circuit 41 and integrator circuit 43 prior to the beginning of each test cycle.

Figure 4:
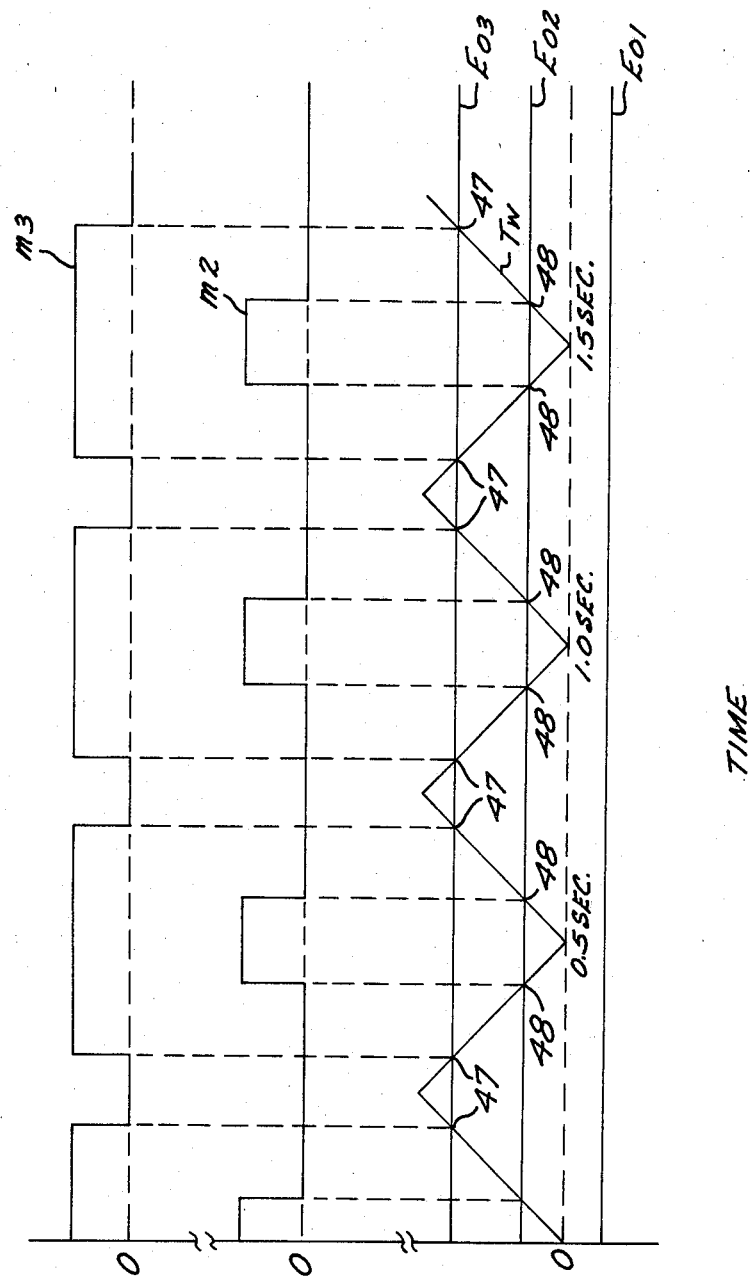
FIG. 4 shows typical duty cycle modulator waveforms.

The output signal Eo of the three mode control unit 40 is used by a duty cycle modulator 45 to modulate a 110 volt A.C. power source which powers the heating blanket 12, the source being coupled to the modulator through line 46 and a 20 Amp circuit breaker 63. Duty cycle modulator 45 is comprised of a triangle wave generator 47 which produces a one Hz triangle waveform voltage output Tw as shown in FIG. 4 which varies from 0.0 volts to approximately 11.7 volts. Further included is a comparator circuit which compares signals Eo and Tw. When signal Eo is greater than signal Tw, the output M of comparator 48 goes high. A negative Eo signal, as represented by waveform Eo1 of FIG. 4, indicates that the achieved temperature Fa is greater than the desired temperature. Signal Eo1 never exceeds signal Tw therefore the comparator output M will remain low. A positive Eo signal (for example, a signal of approximately three volts as represented by waveform Eo2) indicates that the achieved temperature is somewhat less than desired temperature. Comparator 45 will switch at points 48 where signal Eo2 is equal to signal Tw so as to produce a comparator output signal M2, having a duty cycle somewhat less than 50%. A Eo signal of approximately 10.0 volts, as represented by waveform Eo3, will cause comparator 45 to switch at points 47 thereby producing a comparator output signal M3 having a duty cycle which approaches 100%. Duty cycle modulator 45 further includes a conventional solid state relay 62 (FIG. 2) which switches the A.C. power provided on line 46, through 20A circuit breaker 63, in response to control signal M. When signal M is high, solid state relay applies the A.C. power to the heating blanket. Relay 62 switches on the A.C. power zero voltage crossings so as to reduce the noise induced into the temperature measurement system.

The subject controller further includes a fail safe system 49 which provides an interrupt signal on line 50 to relay 62 which causes the relay to shut off power to the heating blanket if any one of the following conditions exist:

(i) the fuel temperature is greater than 95° F.;
(ii) the lapsed time since the start of the test is greater than 60 minutes; or
(iii) the test has not started.

Referring back to FIG. 3, the subject controller is further provided with digital comparators 51 and 52, both of which are coupled to the BCD time data on line 32. Comparator 51, which is provided with a present value which corresponds to 50 minutes, activates an alarm 53 when the elaspsed test time is 50 minutes thereby indicating that the test is almost completed. Comparator 52, which is present with a digital value corresponding to 60 minutes, causes an end of alarm 53 to go on when the elapsed test time is 60 minutes (thereby indicating that the test is completed). An additional alarm 55 is provided which indicates that the automatic mode has been overridden by switch 37. The outputs of over temperature comparator 30, end of test comparator 52 and begin of test comparator 34 are "ORed" together to provide the fail safe system 49 interrupt signal on line 50.

An audible alarm 56 is also provided which indicates when the achieved fuel temperature Fa differs from the desired temperature Fd by more than 2° F. An analog comparator circuit 57, which is preset with a D.C. voltage which corresponds to +2° F. (+0.2 volts), compares the preset value with the error signal E provided by error circuit 38. When the error signal E exceeds +0.2 volts, comparator 57 actuates audible alarm 56 and a "+2° F. error alarm" circuit 58. Similarly, a second analog comparator 59 is present with a −0.2 volt reference which corresponds to a −2° F. error. When the error signal E falls below −0.2 volts, comparator 59 actuates audible alarm 56 and a "−2° F. error alarm" circuit 60. Also provided is an alarm silence circuit 61 which permits audible alarm 61 to be manually silenced.

Having described the various circuit blocks which comprise the subject temperature achievement controller, a brief description of the operation of the controller will now be given. The temperature of the fuel tank 10 under test is initially below 60° F. Accordingly, time display and counter circuit 31 has not yet received a "run" signal from comparator 34. The BCD time data on line 32 is all zeros, therefore, the output of DAC 35 will be at 0.0 volts. The 0.0 volt input to the offset/span circuit 36 will cause a 6.0 volt output signal Fr. Assuming that the subject controller is in the automatic mode, the panel override switch 37 selects the Fr signal to be the desired temperature signal Fd presented to error circuit 38.

Inasmuch as the achieved temperature of the fuel tank is less than 60° F., the achieved fuel temperature signal at the output of DAC 26 will be less than 6.0 volts. Thus, the error signal output E of error circuit 38 will be a positive voltage, the magnitude of which is equal to the difference between the achieved fuel temperature Fa and the desired fuel temperature Fd.

The positive error signal E is processed by the three mode control unit 40 which produces a composite output signal Eo which is proportional to the sum of signal E, the derivative of signal E together with the integral of signal E. The output Eo of the three mode control unit sets the voltage at which the comparator 45 of the duty cycle modulator switches on the Tw signal waveform. The positive Eo signal will produce a comparator output M having duty cycle approaching 100%. Inasmuch as the test has just been initiated, no interrupt signal is present on line 50; therefore power will be applied to the heating blanket 12 almost 100% of the time causing the fuel tank 10 to rapidly become heated. As the temperature of the fuel tank approaches 60° F., the magnitude of the Eo signal out of the three mode control unit 40 diminishes thereby reducing the duty cycle of comparator signal M and, correspondingly, the amount of power applied to the heating blanket. When the tank temperature reaches the 60° F. point at time $t_0$ comparator 34 (FIG. 3) generates a "run" signal on line 33 causing the normally reset time and display counter 31 to begin counting. The incrementing BCD time signal on line 32 produces a linear ramp voltage at the output of DAC 35 which is processed by offset and span circuit 36 to produce the desired temperature signal Fd shown in FIG. 1A. Error circuit 38 produces an error signal E which controls the duty cycle of the modulated A.C. power so as to produce an achieved fuel tank temperature Fa which tracks the desired temperature Fd well within the required ±2° F. limit.

It may be necessary to make initial adjustments to the three mode control unit 40 in order to optimize the response of the subject controller. If the fuel temperature recorder indicates that the achieved fuel tank temperature Fa is running lower than the desired temperature Fd by a constant amount, the summing circuit 44 of the three mode control unit 40 should be adjusted to increase the effect of the integrator 43 output. Similarly, if the achieved temperature is running consistently higher than the desired temperature, summing circuit 44 should be adjusted to decrease the contribution of the integrator to the composite Eo signal. Finally, if the achieved temperature is oscillating around the desired temperature, the summing circuit should be adjusted to give the differentiator more effect and the integrator less. (Note that the system needs about 10 minutes to restabilize after any adjustment is made to the three mode control unit.) By careful adjustment, the subject temperature achievement controller should be able to hold the achieved fuel tank temperature to within 0.5 degrees F. of the desired temperature.

At $t_0$ plus 50 minutes, comparator 51 causes the 50 minute alarm 53 to go off thereby warning the operator that the end of the test is near. At $t_0$ plus 60 minutes, comparator 52 actuates the end of test alarm 54 and produces an interrupt signal on line 50 causing fail safe system 49 to shut off power to the heating blanket 12 thereby concluding the test.

What is claimed is:

1. A temperature achievement controller for controlling the temperature of a device which is heated by a heating unit in accordance with a predetermined temperature versus time curve, said controller comprising:
   temperature sensing means for producing an achieved temperature signal which corresponds to an achieved temperature of the device;
   generating means for generating a desired temperature signal which varies with time in accordance with said predetermined temperature versus time curve;
   initiating means responsive to said achieved temperature signal for causing said generating means to commence generating said desired temperature signal when said achieved temperature reaches a predetermined value;
   error detecting means for producing an error signal proportional to the difference between said achieved temperature signal and said desired temperature signal;
   differentiating means for generating a first signal proportional to the derivative with respect to time of said error signal;
   integrating means for generating a second signal proportional to the integral with respect to time of said error signal;
   proportioning means for generating a third signal proportional to said error signal; and
   summing means for generating a control signal which comprises the sum of said first, second and third signals;
   duty cycle modulating means for switching power supplied to the heating unit on and off with the ratio of the power on time period to the power off time period being proportional to said control signal;
   whereby when said achieved temperature is less than said desired temperature, said power on/power off time ratio increases and when said achieved temperature is greater than said desired temperature said ratio decreases thereby maintaining said achieved temperature substantially at said desired temperature level.

2. The controller of claim 1 wherein said desired temperature signal of said generating means is a linear ramp voltage signal.

3. The controller of claim 2 wherein said generating means comprises:
   counting means for generating a digital signal which increments with time; and
   a digital to analog converter means for converting said digital signal to said linear ramp voltage signal.

4. The controller of claim 3 further comprising offset circuit means for providing a predetermined offset voltage for said linear ramp voltage signal.

5. The controller of claim 4 further comprising span circuit means for providing a predetermined change in said linear ramp voltage per unit time.

6. The controller of claim 3 further comprising reset means for maintaining said counting means in a reset condition until said achieved temperature signal corresponds to a predetermined temperature.

7. The controller of claim 1 wherein said duty cycle modulating means comprises:
   means for generating a triangle waveform signal;
   comparator means for comparing said triangle waveform signal with said control signal; and
   power switching means responsive to said comparator means for switching on and off the power to the heating unit.

8. The controller of claim 7 wherein said desired temperature signal of said generating means is a linear ramp voltage signal.

9. The controller of claim 8 wherein said generating means comprises:
   counting means for generating a digital signal which increments with time; and
   a digital to analog converter means for converting said digital signal to said linear ramp voltage signal.

10. The controller of claim 9 further comprising reset means for maintaining said counting means in a reset condition until said achieved temperature signal corresponds to a predetermined temperature.

11. The controller of claim 10 wherein said power switching means comprises a solid state relay.

12. A temperature achievement controller for controlling the temperature of a device which is heated or cooled by a heating/cooling unit in accordance with a predetermined temperature versus time schedule, said controller comprising:
   temperature sensing means for producing an achieved temperature signal which corresponds to an achieved temperature of the device;

generating means for generating a desired temperature signal which varies with time in accordance with said predetermined temperature versus time schedule;

initiating means responsive to said achieved temperature signal for causing said generating means to commence generating said desired temperature signal when said achieved temperature reaches a predetermined value;

error detecting means for producing an error signal proportional to the difference between said achieved temperature signal and said desired temperature signal;

a three mode control means for producing a control signal which comprises the sum of (i) the derivative with respect to time of said error signal, (ii) the integral with respect to time of said error signal and (iii) said error signal; and duty cycle modulating means for switching power supplied to said heating/cooling unit on and off with the ratio of the power on time to power off time being proportional to said control signal.

13. The controller of claim 12 wherein said generating means comprises a digital counter which sequentially produces a predetermined digital signal and a digital to analog converter which is driven by said predetermined digital signal.

14. The controller of claim 13 wherein said duty cycle modulating means comprises:

means for generating a triangle waveform signal;

comparator means for comparing said triangle waveform signal with said control signal; and power switching means responsive to said comparator means for switching on and off the power to said heating/cooling unit.

* * * * *

UNITED STATES PATENT AND TRADEMARK OFFICE
CERTIFICATE OF CORRECTION

PATENT NO. : 4,362,924
DATED : December 7, 1982
INVENTOR(S) : Gene F. Storey and John T. La Belle It is certified that error appears in the above—identified patent and that said Letters Patent is hereby corrected as shown below:

Column 1, line 37, "is" should be --in--.

Column 2, line 36, "oprator" should be --operator--.

Column 3, line 37, "constant an" should be --constantan--; line 67, "produces" should be --produced--.

Column 4, line 23, "present" should be --preset--.

Column 6, line 2, "present" should be --preset--; line 6, "present" should be --preset--; line 25, "present" should be --preset--.

Signed and Sealed this

Twenty-first Day of June 1983

[SEAL]

Attest:

DONALD J. QUIGG

Attesting Officer     Acting Commissioner of Patents and Trademarks